US011943008B2

(12) United States Patent
Chen et al.

(10) Patent No.: US 11,943,008 B2
(45) Date of Patent: *Mar. 26, 2024

(54) NFC CHARGING

(71) Applicants: STMICROELECTRONICS LTD, Kowloon (HK); STMICROELECTRONICS (ROUSSET) SAS, Rousset (FR)

(72) Inventors: Chia Hao Chen, Taipei (TW); Nicolas Cordier, Aix-en-Provence (FR)

(73) Assignees: STMICROELECTRONICS LTD, Kowloon (HK); STMICROELECTRONICS (ROUSSET) SAS, Rousset (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,958

(22) Filed: Jan. 12, 2023

(65) Prior Publication Data
US 2023/0170938 A1 Jun. 1, 2023

Related U.S. Application Data

(63) Continuation of application No. 17/475,211, filed on Sep. 14, 2021, now Pat. No. 11,588,519.

(30) Foreign Application Priority Data

Sep. 18, 2020 (FR) ........................... 2009452

(51) Int. Cl.
*H04B 5/00* (2006.01)
*H02J 50/10* (2016.01)
(Continued)

(52) U.S. Cl.
CPC ............ *H04B 5/0037* (2013.01); *H02J 50/10* (2016.02); *H02J 50/80* (2016.02); *H02J 50/90* (2016.02);
(Continued)

(58) Field of Classification Search
CPC .. H04B 5/0037; H04B 5/0031; H04B 5/0081; H04B 5/0075; H04B 17/318; H02J 50/10;
(Continued)

(56) References Cited

U.S. PATENT DOCUMENTS 8,228,899 B2 * 7/2012 Kim ................. H04W 52/0225
370/352
9,367,785 B2 * 6/2016 Sabesan ............... G01S 13/878
(Continued)

FOREIGN PATENT DOCUMENTS

EP 2747193 A1 6/2014
WO WO 2005069195 A1 7/2005
(Continued)

OTHER PUBLICATIONS

Belkin, "Indicator light behavior of the Belkin Boost Up Qi Wireless Charging Pad, F8M741 and F8M747," URL=https://www.belkin.com/au/support-article?articleNum=123739, download date Jul. 20, 2021, 3 pages.
(Continued)

*Primary Examiner* — Andrew Wendell
(74) *Attorney, Agent, or Firm* — Seed IP Law Group LLP

(57) ABSTRACT

The present disclosure relates to a method for aligning a smartphone providing NFC wireless power for charging a battery of a device, the method comprising: emitting, with a first NFC antenna of the smartphone, an NFC field for wirelessly charging the battery of the device comprising a second NFC antenna; obtaining, with the smartphone, a measured value of a signal representative of the NFC field strength between the smartphone and the device; determining, by the smartphone, a range of values of a plurality of ranges of values the measured value belongs; and emitting,
(Continued)

by the smartphone, at least one notification signal to a user with a frequency determined by the determined range of values.

17 Claims, 3 Drawing Sheets

(51) Int. Cl.
*H02J 50/80* (2016.01)
*H02J 50/90* (2016.01)
(52) U.S. Cl.
CPC ......... *H04B 5/0031* (2013.01); *H04B 5/0081* (2013.01)
(58) Field of Classification Search
CPC ............ H02J 50/80; H02J 50/90; H02J 50/20; H04W 52/245
See application file for complete search history.

(56) References Cited

U.S. PATENT DOCUMENTS

| | | | |
|---|---|---|---|
| 9,496,744 | B2 | 11/2016 | Porat et al. |
| 10,862,540 | B1 | 12/2020 | Osborn et al. |
| 11,588,519 | B2* | 2/2023 | Chen .................... H04B 5/0031 |
| 2008/0296978 | A1 | 12/2008 | Finkenzeller et al. |
| 2009/0046654 | A1 | 2/2009 | Hoshi et al. |
| 2012/0208458 | A1 | 8/2012 | Iwasaki et al. |
| 2013/0084801 | A1 | 4/2013 | Royston et al. |
| 2013/0096651 | A1 | 4/2013 | Ozawa et al. |
| 2013/0214735 | A1 | 8/2013 | Kang et al. |
| 2014/0011452 | A1 | 1/2014 | Ji et al. |
| 2014/0065959 | A1 | 3/2014 | Tanaka et al. |
| 2014/0168012 | A1 | 6/2014 | Mankowski et al. |
| 2014/0361735 | A1 | 12/2014 | Li et al. |
| 2015/0100109 | A1 | 4/2015 | Feldman et al. |
| 2015/0223084 | A1 | 8/2015 | Lightstone et al. |
| 2015/0363617 | A1 | 12/2015 | Honore |
| 2017/0033587 | A1 | 2/2017 | Hong et al. |
| 2018/0053995 | A1 | 2/2018 | Randell et al. |
| 2019/0219678 | A1* | 7/2019 | Miyazawa .............. E05B 49/00 |
| 2019/0305567 | A1 | 10/2019 | Keeley et al. |
| 2020/0287426 | A1 | 9/2020 | Granito et al. |
| 2020/0303958 | A1 | 9/2020 | Tanii et al. |
| 2020/0382630 | A1* | 12/2020 | Jin .................... H04M 1/72454 |
| 2021/0096515 | A1 | 4/2021 | Ruaro et al. |
| 2021/0120521 | A1 | 4/2021 | Bin Redhwan et al. |
| 2022/0042854 | A1 | 2/2022 | Nagasawa |
| 2022/0057453 | A1 | 2/2022 | Nicklaus et al. |
| 2022/0103023 | A1 | 3/2022 | Govindaraj et al. |
| 2022/0239335 | A1 | 7/2022 | Cordier et al. |
| 2023/0239006 | A1* | 7/2023 | Fleischhacker ....... H04W 56/00 455/41.1 |

FOREIGN PATENT DOCUMENTS

| | | |
|---|---|---|
| WO | WO 2014037888 A1 | 3/2014 |
| WO | WO 2014202403 A1 | 12/2014 |

OTHER PUBLICATIONS

Mearian, L., "Review: 4 wireless chargers for both smartphone and watch (one of which does earbuds, too)," URL=https://www.computerworld.com/article/3326823/review-4-wireless-chargers-for-both-smartphone-and-watch.html, download date Jul. 20, 2021, 11 pages.

Ion Audio, "Ion Audio Pathfinder Charger—Frequently Asked Questions," URL=https://www.ionaudio.com/KB/ION-AUDIO-PATHFINDER-CHARGER-FREQUENTLY-ASKED-QUESTIONS/, download date Jul. 20, 2021, 6 pages.

Samsung, SM-R800, SM-R805F, SM-R810, SM-R815F User Manual Rev. 1.2, www.samsung.com, 154 pages, 2018.

* cited by examiner

NFC CHARGING

BACKGROUND

Technical Field

The present disclosure relates generally to wireless charging, and more particularly to NFC ("Near Field Communication") wireless charging.

Description of the Related Art

Communications of the NFC type, that is to say communications according to NFC communication protocols, are known. In such communications, a first device, generally called transmitter, generates or provides an electromagnetic field also called carrier field, typically at 13.56 MHz. A second device, generally called receiver, receives the electromagnetic field. The transmitter is capable of modulating the carrier field to send data to the receiver. The receiver may be capable of modulating the carrier field provided by the transmitter to send data to the transmitter.

It is also known to use this carrier field to wirelessly charge a battery of the receiver, when the receiver is adapted to NFC charging. This allows the same NFC antenna, that is to say, in an NFC-enabled device, the antenna used for communicating according to NFC communication protocols, to be used to manage both communications and charging. NFC charging is for example discussed in the Wireless Charging Specification (WLC).

Known NFC charging methods and known devices used in such methods suffer from various drawbacks.

BRIEF SUMMARY

For example, the present disclosure is directed to aligning the transmitter which sends power and the receiver which is wirelessly charged, in order to improve the power transfer from the transmitter to the receiver, for example when the transmitter is a smartphone.

One embodiment provides a method for aligning a smartphone providing NFC wireless power for charging a battery of a device, the method comprising:

emitting, with a first NFC antenna of the smartphone, an NFC field for wirelessly charging the battery of the device comprising a second NFC antenna;

obtaining, with the smartphone, a measured value of a signal representative of the NFC field strength between the smartphone and the device;

determining, by the smartphone, a range of values of a plurality of ranges of values the measured value belongs; and emitting, by the smartphone, at least one notification signal to a user with a frequency determined by the determined range of values.

According to one embodiment, the smartphone comprises:

a first face having a screen; and a second face opposite to the first face, the first NFC antenna being disposed behind the second face, wherein, during the NFC charging, the device is disposed above and facing the second face.

According to one embodiment, the at least one notification signal is a light signal emitted by a light source disposed on the second face and/or a sound signal emitted by a speaker of the smartphone.

According to one embodiment, the frequency varies with the strength of the NFC field between the smartphone and the device.

According to one embodiment, the frequency decreases when the strength of the NFC field increases, the frequency being preferably null when the measured value belongs to the range of values corresponding to a maximal NFC field strength.

According to one embodiment, the signal representative of the strength of the NFC field is a feeding current provided by the smartphone to the first NFC antenna, and wherein obtaining the measured value comprises measuring, with the smartphone, the feeding current.

According to one embodiment, the signal representative of the strength of the NFC field is a AC voltage between extremities of the first NFC antenna, and wherein obtaining the measured value comprises measuring, with the smartphone, an envelope of the AC voltage or an envelope of an image voltage of the AC voltage.

According to one embodiment, the signal representative of the strength of the NFC field is a charging current provided to the battery of the device by the second NFC antenna, and wherein obtaining the measured value comprises:

measuring, with the device, the charging current and transmitting, by the device to the smartphone, the measured value using NFC communication.

According to one embodiment, the steps of obtaining the measured value, determining the range of values and emitting said at least one notification signal are periodically repeated, preferably until the NFC charging ends.

According to one embodiment, determining the range of values comprises comparing the measured value with thresholds corresponding to boundaries of each range of values of the plurality of ranges of values.

One embodiment provides a smartphone configured to implement the described method, wherein:

the smartphone comprises a first NFC antenna and is configured to emit, by means of the first NFC antenna, an NFC field for wirelessly charging a battery of a device comprising a second NFC antenna;

the smartphone is configured to obtain a measured value of a signal representative of the NFC field strength between the smartphone and the device;

the smartphone is configured to determine to which of a plurality of ranges of values said measured value belongs; and the smartphone is configured to emit at least one notification signal to a user, with a frequency determined by the determined range of values.

According to one embodiment, a smartphone comprises a first face having a screen and a second face opposite the first face, wherein the first NFC antenna is disposed behind the second face, and wherein NFC field emitted by the first NFC antenna is configured to wirelessly charge the battery of device comprising a second NFC antenna.

According to one embodiment:

a smartphone comprises a light source disposed on the second face, the at least one notification signal being a periodic flashing light signal emitted by the light source, the light source being preferably a flash of an image captor or camera or image sensor of the smartphone; and/or the smartphone comprises a speaker, the at least one notification signal being a sound emitted by the speaker, the speaker being preferably configured to emit other sounds than the notification signal.

According to one embodiment, the signal representative of the strength of the NFC field is a charging current provided to the battery of the device from the second NFC antenna, the smartphone being configured to receive the measured value send by the device using NFC communication.

One embodiment provides a device configured to implement the method described, wherein the device comprises a battery and a second NFC antenna configured to be coupled with a first NFC antenna of a smartphone, the device being configured to charge the battery using a NFC field emitted by the first antenna and received by the second antenna, to measure a value of a charging current provided to the battery from the second antenna and to send the measured value to the smartphone using NFC communication, the charging current provided to the battery being the signal representative of the strength of the NFC field between the smartphone and the device, the device being preferably an internet of things, IoT, device.

BRIEF DESCRIPTION OF THE SEVERAL VIEWS OF THE DRAWINGS

The foregoing features and advantages, as well as others, will be described in detail in the following description of specific embodiments given by way of illustration and not limiting with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful to understand the embodiments described herein have been illustrated and described in detail. In particular, the NFC communication protocols and the usual electronic devices or circuits implementing these protocols have not been described as well as the known devices. These protocols are well-known by the one skilled in the art and compatible. In the same manner, the NFC charging, for example according to the WLC specification, and the usual electronic devices or circuits adapted to the NFC charging have not been described, the described embodiments being compatible with NFC charging and with these usual devices.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "rear", "top", "bottom", "left", "right", etc., or to relative positional qualifiers, such as the terms "above", "below", "higher", "lower", "behind", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following disclosure, unless specified otherwise, the expression "NFC communication" means a communication according to the NFC protocols, or said in other words, according to the NFC specification. The expression "NFC charging" means a wireless charging using NFC technologies, preferably a wireless charging according to the WLC specification. The expression "NFC antenna" means the antenna which is used for NFC communications and for NFC charging. The expression "NFC field" means the electromagnetic field used for an NFC communication or for NFC charging between two devices.

Figure 1:
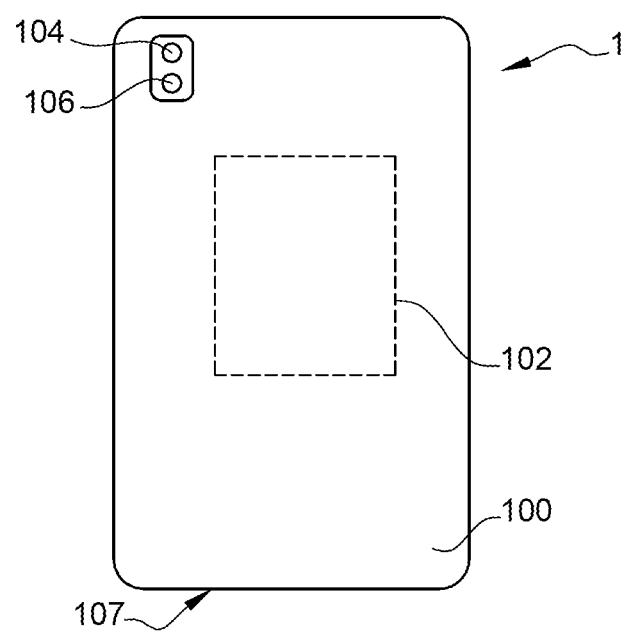
FIG. 1 is a schematic rear-view of an embodiment of an NFC-enabled smartphone configured to wirelessly charge a device via NFC charging.

FIG. 1 is a schematic rear-view of an NFC-enabled smartphone 1 configured to wirelessly charge a device via NFC charging.

The smartphone 1 comprises a front face (not visible in FIG. 1) having a screen. The smartphone 1 comprises a back face 100, opposite to the front face.

The smartphone 1 comprises an NFC antenna 102 indicated by dotted lines. The NFC antenna 102 is disposed inside the smartphone 1, between the front face and the back face 100 of the smartphone 1. More precisely, the NFC antenna is disposed on the side of the back face 100, for example against the back face 100. In other words, the NFC antenna 102 is disposed behind the back face 100. The NFC antenna 102 is for example disposed in a plane parallel to the back and front faces.

In one embodiment, the smartphone 1 comprises a light source 104, preferably a light emitting diode or LED. The light source 104 is disposed on the back face 100. Preferably, the light source 104 is the flash of an image sensor 106 of the smartphone 1. The image sensor 106 has an objective disposed in an aperture in the back face 100.

In one embodiment, the smartphone 1 comprises a speaker 107. In this example, the speaker 107 is indicated as being disposed on the bottom edge of the smartphone 1, but can be disposed in another location (front face, rear face, side edge, top edge . . . ) depending on the model. The speaker 107 is preferably configured to emit sounds such as music or the voice of a person in phone conversation with the user of the smartphone 1.

In one embodiment, the smartphone 1 comprises both the light source 104 and the speaker 107.

Figure 2:
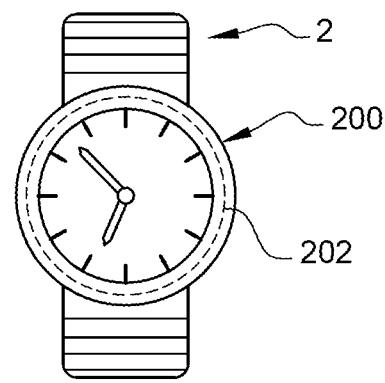
FIG. 2 is a schematic front-view of an embodiment of an NFC-enabled device configured to be charged via NFC charging, for example by the smartphone of FIG. 1.

FIG. 2 is a schematic front-view of an embodiment of an NFC-enabled device 2 configured to be charged via NFC charging, for example by the smartphone 1 in FIG. 1.

The device 2 is, for example, an Internet of Things (IoT) device, in this example a smartwatch, although the present disclosure is not limited to a smartwatch 2, nor to an IoT device 2. For example, the device 2 could be wireless headphones that need to be charged via NFC charging.

The device 2 comprises a front face 200 and an NFC antenna 202 (in dotted lines in FIG. 2) disposed behind the front face 200. The antenna 202 is, for example, disposed in a plan approximatively parallel to the front face 200.

As an example, the front face 200 may comprise means for displaying information to a user, such as lights, for example LED lights, that may flash, or such as a screen. For example, when device 2 is a smartwatch, the front face 200 comprises a screen to display time, and eventually other information. Nevertheless, other devices 2 may not comprise means for displaying information (specifically a screen).

The device 2 comprises a battery not visible in FIG. 2. The device 2 is configured to charge its battery using NFC charging. Thus, in the following disclosure, unless specified otherwise, charging device 2 via NFC charging means charging the battery of device 2 via NFC charging.

According to one embodiment, the device 2 does not have light source, screen or other user interface disposed on its back face, that is to say the face of device 2 opposite the front face 200.

Figure 3:
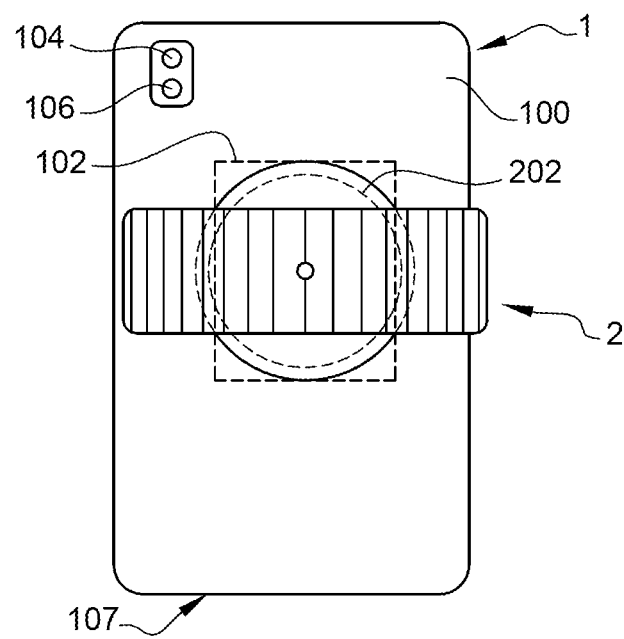
FIG. 3 schematically represents the smartphone of FIG. 1 and the device of FIG. 2 during NFC charging.

FIG. 3 schematically represents the smartphone 1 of FIG. 1 and the device 2 of FIG. 2 during NFC charging of the device 2 by the smartphone 1. In FIG. 3, the smartphone 1 acts as an NFC transmitter providing an NFC electromagnetic field for charging the device 2, which acts as a receiver.

During NFC charging, the device 2 is disposed near the smartphone 1, preferably in contact with the smartphone 1, such that the front face 200 of device 2 (not visible in FIG. 3) is facing the back face 100 of the smartphone 1, and such that the antenna 102 is coupled with the antenna 202. In order to maximize the coupling between the antennas 102 and 202, and thus the power transfer from smartphone 1 to device 2, the smartphone 1 should be aligned with the device 2, or, in other words, the antenna 102 of smartphone 1 should be aligned with the antenna 202 of device 2. The antennas 102 and 202 are said to be aligned for example when, for a given power provided by the smartphone 1 to its antenna 102, the NFC field between device 2 and smartphone 1 is at a maximum.

However, it is difficult for a user to align the antennas 102 and 202. Indeed, as the device 2 is disposed on the side of the back face 100 of the smartphone 1, the user does not have access to the screen of the smartphone, which could be used to display information relative to the alignment of the antennas 102 and 202. Further, such information cannot be displayed by the back face of device 2 when the back face is devoid of screen for displaying such information, which generally the case in practice. For example, the back face of a smartwatch such as the smartwatch 2 is disposed against the user's wrist while in use, thus does not comprise information display means on the back face.

An alignment marker may be added to the back face 100 of smartphone 1 to indicate the user where to dispose device 2 relative to smartphone 1, such that the antennas 102 and 202 are aligned. However, for esthetic reasons, smartphones manufacturers generally do not want such alignment markers on their products. Further, even if such alignment markers were provided on the back face 100 of the smartphone 1, it cannot be seen by the user when the smartphone 1 is put in a protective cover, which is mostly the case in practice.

There is thus a need to provide a method for NFC charging in which the user is aided with alignment of the NFC antenna 102 of the smartphone 1 with the NFC antenna 202 of device 2.

It is here proposed to use a smartphone's existing means or devices to help a user during NFC antenna alignment for NFC charging. More precisely, it is here proposed to get, or obtain, by the smartphone, a measured value of a signal representative of the NFC field strength between the smartphone and a device intended to be charged via NFC charging. The smartphone then determines to which range of values the measured value belongs, the range of values being one of a plurality of ranges of values. The smartphone then emits at least one notification signal to the user with a frequency determined by the determined range of values. By doing so, when the user moves the device relative to the smartphone, the user can know if the strength of the NFC field increase or decrease thanks to the frequency variations of the notification signal(s). Thus, the user can move the device relative to the smartphone until the strength of the NFC field between the NFC antennas of the smartphone and the device is at a maximum, or, in other words, until the NFC antennas are aligned. According to an embodiment, the notification signal is a light signal, such as a flashing light, emitted by a light source disposed on the side of the back face of the smartphone, such as the light source 104 disposed on the rear face 100 of smartphone 1 previously described, and/or a sound signal emitted by a speaker of the smartphone, such as the speaker 107 of the smartphone 1 previously described.

Figure 4:
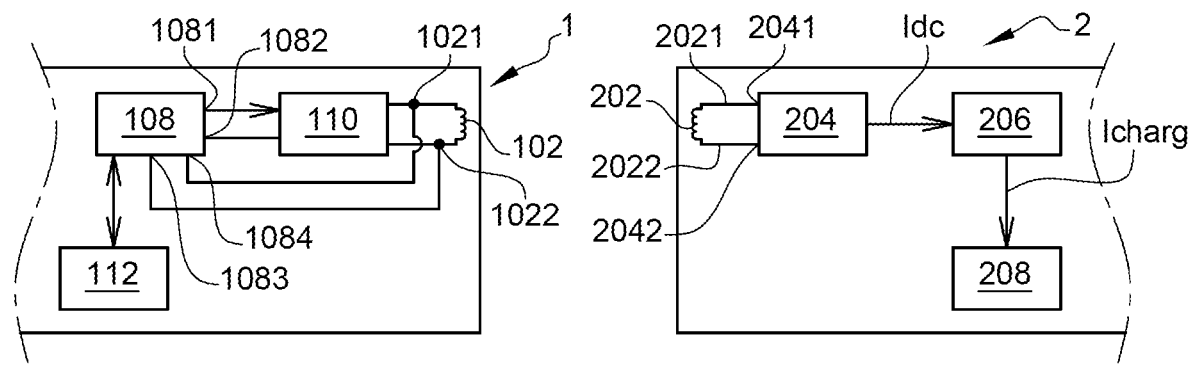
FIG. 4 represents, in a schematic manner and in the form of blocks, a part of the smartphone of FIG. 1 and a part of the device of FIG. 2.

FIG. 4 represents, in a schematic manner and in the form of blocks, a part of the smartphone 1 of FIG. 1 and a part of the device 2 of FIG. 2 according to an embodiment.

Smartphone 1 comprises the NFC antenna 102, schematically represented by a coil in FIG. 4, and device 2 comprises the NFC antenna 202, schematically represented by a coil in FIG. 4.

The NFC antenna 102 comprises two extremities 1021 and 1022, which are electrically coupled to two corresponding terminals 1081 and 1082 of a circuit 108 by an impedance matching circuit 110. The circuit 108 is an NFC controller.

The circuit 108 is configured to feed the antenna 102 with an alternating current (AC) signal, preferably a feeding current, so that a corresponding NFC electromagnetic field is emitted by the antenna 102. The AC signal feeding the antenna 102 is provided by terminals 1081 and 1082. The circuit 108 is further configured to modulate the AC signal provided to the antenna 102, so that the NFC electromagnetic field is modulated accordingly and data could be sent to the receiver 2.

According to one embodiment, the circuit 108 is configured to measure the feeding current provided to the antenna 102 by terminals 1081 and 1082. The value of this current is representative of the strength of the NFC field between the smartphone 1 and the device 2, and thus of the position of the antenna 202 of the device 2 relative to the antenna 102 of the smartphone 1. Indeed, the position of device 2 relative to the smartphone 1 for example affects the impedance seen by the circuit 108 between terminals 1081 and 1082 due to a different loading effect. As a result, the AC signal sent by circuit 108 changes because voltage between terminals 1081 and 1082 is kept constant and voltage, current and impedance are linked together by Ohm's law. Preferably, in this embodiment, the measurement of the feeding current is done with no data exchange between the smartphone 1 and the device under charge 2, or, said in other words, the signal representative of the strength of the NFC field is different from, or not based on, a value measured by the device 2 and sent to the smartphone using a wireless communication, and in particular a NFC wireless communication using the NFC field.

The two extremities 1021 and 1022 are further coupled to two terminals 1083 and 1084 of the circuit 108, for example by capacitive and/or resistive divider. The alternating (AC) voltage received by the terminals 1083 and 1084 of the circuit 108 is thus an image or copy of the AC voltage between the extremities 1021 and 1022 of the antenna 102. In other words, the AC voltage between terminals 1083 and 1084 is representative of the AC voltage between extremities 1021 and 1022 of the antenna 102. The two terminals 1083 and 1084 are coupled to a demodulator circuit (not shown) of the circuit 108, for example to an I/Q mixer of this demodulator circuit. The circuit 108 is configured to demodulate the AC signal available between the extremities 1021 and 1022 of the antenna 102, in order to receive data sent by the device 2 using NFC communication, for example by means of load modulation of the device 2 on the carrier field. In order to demodulate the AC voltage between terminals 1083 and 1084, the circuit 108, and more particularly its demodulator circuit, is configured to extract the envelope and, preferably, the phase of this AC voltage.

According to one embodiment, the circuit 108, and more particularly its demodulator circuit, is configured to measure the voltage between its terminals 1083 and 1084, thus between extremities 1021 and 1022 of the antenna 102. More precisely, the circuit 108, and more particularly its demodulator circuit, is configured to measure the value of the envelope of the AC voltage between terminals 1083 and 1084, the envelope being a voltage. In other words, the circuit 108, and more particularly its demodulator circuit, is configured to measure the amplitude of the envelope of the AC voltage between terminals 1083 and 1084. The value of this voltage is representative of the strength of the NFC field between the smartphone 1 and the device 2, and thus of the position of the antenna 202 of the device 2 relative to the antenna 102 of the smartphone 1. Preferably, in this embodiment, the measurement of the envelope of the AC voltage is done with no data exchange between the smartphone 1 and the device under charge 2, or, said in other words, the signal representative of the strength of the NFC field is different from, or not based on, a value measured by the device 2 and sent to the smartphone using a wireless communication, and in particular a NFC wireless communication using the NFC field.

According to an embodiment, the smartphone 1 comprises a processing unit 112. The processing unit 112 is configured to exchange data with the NFC controller 108, and with other devices of the smartphone 1. According to one embodiment, the circuit 112 is configured to command the light source 104 and the speaker 107 of the smartphone 1 described previously in relation with FIG. 1.

Although not shown in FIG. 4, the smartphone 1 comprises other circuits, which are usual circuits well known to a person skilled in the art.

The NFC antenna 202 comprises two extremities 2021 and 2022, which are electrically coupled, preferably connected, to two corresponding terminals 2041 and 2042 of a circuit 204 of the device 2.

The circuit 204 is configured to manage NFC communication. In other words, the circuit 204 is configured to demodulate a signal available between extremities 2022 and 2021 of the NFC antenna 202, in order to receive data sent by the smartphone using NFC communication protocols.

The circuit 204 is further configured to manage NFC charging. In other words, the circuit 204 is configured to convert the AC electric signal available between the extremities 2021 and 2022 of the NFC antenna 202 in a direct current (DC) Idc. The current Idc is provided by the circuit 204 to a circuit 206. The circuit 206 is battery charger which is configured to charge a battery 208 of the device 2 from the current Idc. The circuit 206 provides a charging current Icharg to the battery 208.

According to one embodiment, the device 2, and more particularly its circuit 206, is configured to measure the charging current Icharg provided to the battery 208. The value of this current is representative of the strength of the NFC field between the smartphone 1 and the device 2, and thus of the position of the antenna 202 of the device 2 relative to the antenna 102 of the smartphone 1.

According to one embodiment, the device 2, and more particularly its circuit 204, is configured to send data to the smartphone using NFC communication, for example by retro-modulating the NFC field provided by the smartphone. According to a preferred embodiment, the device 2 is configured to send to the smartphone 1 the measured value of the current Icharg, by using NFC communication.

Although not shown in FIG. 4, the device 2 comprises other circuits, which are usual circuits well known by the one skilled in the art, for example an NFC chip or tag, an NFC impedance matching circuit, a power management unit, a processing unit or processor or integrated circuit, etc.

Figure 5:
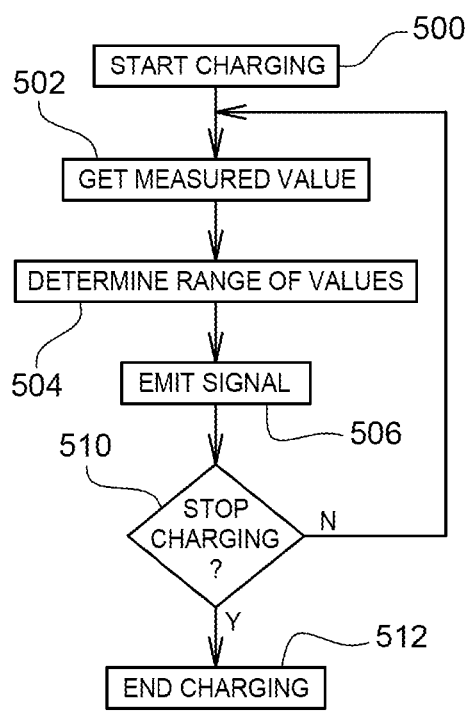
FIG. 5 is a flow chart illustrating an embodiment of an NFC charging method.

FIG. 5 is a flow chart illustrating an embodiment of an NFC charging method, and more precisely of an alignment method of a smartphone and a device intended to be charged by the smartphone via NFC charging. For example, the smartphone corresponds to the smartphone 1 described in relation with FIG. 1, preferably having the part described in relation with FIG. 4, and the device to be charged via NFC charging is the device 2 described in relation with FIG. 2, preferably having the part described in relation with FIG. 4.

At a first step 500 (block "START CHARGING"), the smartphone 1 provides an NFC field, both for charging the device 2 and for communicating with the device 2. At this step, the device 2 is disposed, by a user, near the smartphone 1 on the back face 100 of the smartphone 1, preferably in contact with the face 100, the front face 200 of the device 2 facing the back face 100 of the smartphone 1. Thus, the antenna 102 is coupled with the antenna 202.

At a next step 502 (block "GET MEASURED VALUE"), the smartphone 1 gets or obtains a measured value of a signal representative of the strength of the NFC field between the smartphone 1 and the device 2.

According to one embodiment, the signal representative of the strength of the NFC field is the AC voltage between the extremities of the antenna 102 of the smartphone 1, and more particularly the envelope (or amplitude) of this AC voltage. In such embodiment, the measurement is made by the smartphone 1 itself. For example, the measurement is done by the circuit 108 (FIG. 4), which for example receives, between terminals 1083 and 1084, an image of the AC voltage between the extremities 1021 and 1022 of the antenna 102. Preferably, the measurement of the amplitude of the AC voltage between terminals 1083 and 1084 is done by means an I/Q mixer circuit of the circuit 108, which is configured to extract the envelope (or amplitude) of the AC voltage between terminals 1083 and 1084, that is to say to provide a voltage corresponding to the AC voltage envelope. Preferably, in this embodiment, the measurement of the envelope of the AC voltage is done with no data exchange between the smartphone 1 and the device under charge 2, or, said in other words, the signal representative of the strength of the NFC field is different from, or not based on, a value measured by the device 2 and sent to the smartphone using a wireless communication, and in particular a NFC wireless communication using the NFC field. In this case, the step 502 of obtaining a measured value of the signal representative of the strength of the NFC field is preferably done with no data exchange between the smartphone 1 and the device 2, or, at least, preferably with no data sent by the device 2 to the smartphone 1 using a wireless communication.

According to one embodiment, the signal representative of the strength of the NFC field is the current provided by the smartphone 1 to its antenna 102 for generating the NFC field. In such an embodiment, the measurement of the value of this current is made by the smartphone 1 itself, for example by its circuit 108 (FIG. 4). Preferably, in this embodiment, the measurement of the current is done with no data exchange between the smartphone 1 and the device under charge 2, or, said in other words, the signal representative of the strength of the NFC field is different from, or not based on, a value measured by the device 2 and sent to the smartphone using a wireless communication, and in particular a NFC wireless communication using the NFC field. In this case, the step 502 of obtaining a measured value of the signal representative of the strength of the NFC field is preferably done with no data exchange between the smartphone 1 and the device 2, or, at least, preferably with no data sent by the device 2 to the smartphone 1 using a wireless communication.

According to one embodiment, the signal representative of the strength of the NFC field is the charging current provided by the device 2 to its battery, for example the current Icharg for charging the battery 208 (FIG. 4). In such an embodiment, as it will be described in more detail with FIG. 6, the step 502 comprises a first sub-step wherein the device 2 measures the current Icharg (or an image of the current Icharg), and a following sub-step wherein the device 2 sends the measured value of the current Icharg to the smartphone 1 using NFC communications. As a result, at the end of the step 502, the smartphone 1 has obtained the measured value of the signal representative of strength of the NFC field.

The step 502 is followed by a step 504 (block "DETERMINE RANGE OF VALUE"). In this step 504, the smartphone 1 determines to which range of values the measured value belongs, the range of values being one of a plurality of ranges of values of the signal representative of the strength of the NFC field. This may be done by the processing unit 112 (FIG. 4) of the smartphone 1. For example, the smartphone 1, and more particularly its processing unit 112, determines to which range of values the measured value belongs by comparing the measured value with thresholds corresponding to the boundaries of these ranges of values.

According to an embodiment, the ranges of values, that is to say their boundaries, are stored in a memory (not shown) of the smartphone 1.

According to an embodiment, each range of values corresponds to different strengths, or intensities or powers, of the NFC field between device 2 and smartphone 1. Thus, depending on which of these ranges of values the measured value belongs, it can be determined whether the smartphone 1 and the device 2 are aligned or not, and, when they are not aligned, the position of the device 2 relative to the position wherein the device 2 is aligned with the smartphone 1 (ideal position). Indeed, the further the device 2 is from the aligned position, the lower the strength of the NFC field.

According to an embodiment, these ranges are determined during a design phase of the smartphone 1 and/or of the device 2. For example, the signal representative of the strength of the NFC field is measured during the smartphone 1 and/or device 2 design phase, while moving the device 2 relative to the smartphone 1. After measurements are done, different ranges of values of this signal are defined, such that these different ranges of values of the signal correspond to different ranges of strengths of the NFC field, and thus to different ranges of positions of the device 2 relative to the smartphone 1. Then, those ranges of values are recorded into a memory (not shown) of the smartphone 1. When implementing the method of FIG. 5, if the measured value of the signal (step 502) is in the range of values which comprises the value of the signal corresponding to the ideal position of the device 2 relative to the smartphone 1 (step 504), the device 2 and the smartphone 1 are for example considered to be aligned.

As a first example, when the signal representative of the strength of the NFC field is the charging current provided to the battery 208 of the device 2, the determination of these ranges of values comprises:

determining the maximum value of the signal when the device 2 is aligned with the smartphone 1;

dividing the maximum value to get a plurality of lower values of the signal; and determining the ranges of values using the maximum and the lower values of the signal as boundaries or as central values of the ranges of values, the ranges of values being preferably contiguous. For example, when the maximum value of the charging current is equal to 50 mA, for example four ranges R1, R2, R3 and R4 of values may be determined as follows:

the range R1 comprises the values X superior or equal to the maximum value (50 mA≤X);

the range R2 comprises values X inferior to the maximum value and superior or equal to 40 mA (40 mA≤X<50 mA);

the range R3 comprises the values X inferior to 40 mA and superior or equal to 20 mA (20 mA≤X<40 mA); and the range R4 comprises the values X inferior to 20 mA (X<20 mA).

As a second example, when the signal representative of the strength of the NFC field is the current provided to antenna 102 of the smartphone 1, the determination of these ranges of values comprises:

determining the optimum value of the signal when the smartphone 1 is aligned with a device intended to be NFC charged by the smartphone 1;

dividing the optimum value to get a plurality of lower values of the signal; and determining the ranges of values using the optimum and the lower values of the signal as boundaries or as central values of the ranges of values, the ranges of values being preferably contiguous. For example, when the optimum value of the current is equal to 200 mA, for example six ranges R1', R2', R3', R4', R5' and R6' of values may be determined as follows:

the range R1' comprises the values X around the optimum value, that is to say between 200 mA+50 mA and 200 mA−50 mA (150 mA≤X<250 mA);

the range R2' comprises the values X between 250 mA and 300 mA (250 mA≤X≤300 mA);

the range R3' comprises the values X superior to 300 mA (300 mA<X);

the range R4' comprises the values X between 150 mA and 100 mA (100 mA≤X<150 mA);

the range R5' comprises the values X between 100 mA and 50 mA (50 mA≤X<100 mA); and the range R6' comprises the values X inferior to 50 mA (X<50 mA).

As a third example, when the signal representative of the strength of the NFC field is the AC amplitude voltage between the extremities 1021 and 1022 of the antenna 102 of the smartphone 1, or, in other words, the AC amplitude voltage between the terminals 1083 and 1084 which is an image of the AC amplitude voltage between extremities 1021 and 1022 of the antenna 102, the determination of these ranges of values comprises:

- determining the optimum value of the signal when the smartphone 1 is aligned with a device intended to be NFC charged by the smartphone 1;
- dividing the maximum value to get a plurality of lower values of the signal; and
- determining the ranges of values using the maximum and the lower values of the signal as boundaries or as central values of the ranges of values, the ranges of values being preferably contiguous. For example, when the optimum value of the AC amplitude voltage between terminals 1083 and 1084 is equal to 3 V, for example five ranges R1", R2", R3", R4" and R5" of values may be determined as follows:
  - the range R1" comprises the values X around the optimum value, that is to say between 3 V+0.5 V and 3 V−0.5 V (2.5 V≤X≤3.5 V);
  - the range R2" comprises the values X between 3.5 V and 4.0 V (3.5 V<X≤4.0 V);
  - the range R3" comprises the values X superior to 4.0 V (4.0 V<X);
  - the range R4" comprises the values X between 2.5 V and 2.0 V (2.0 V≤X<2.5 V); and
  - the range R5" comprises the values X inferior to 2.0 V (X<2.0 V).

It is to be noted that for the above range examples, the less than/greater than/equal to signs are merely indicative, and may be modified as needed.

At a next step 506 (block "EMIT SIGNAL"), at least one notification signal is emitted by the smartphone to the user. Each notification signal is periodic and has a frequency determined by the range of values to which belongs the measured value of the signal representative of the NFC field strength. Thus, the user receiving the notification signal(s) may determine whether the device 2 is aligned with the smartphone 1 or if he/she should move the device 2 relative to the smartphone 1 in order to align the device 2 with the smartphone 1.

According to one embodiment, the notification signal is a flashing light emitted by the light source 104 of the smartphone 1. Thus, when the light source 104 is already provided on the back face 100 of the smartphone 1 for other purposes, which is the case in practice, the notification signal can be emitted without adding a specific device to the smartphone 1. Further, an advantage of using such a light source 104 is that it can been seen by the user, even when the device 2 is disposed on the back face 100 of the smartphone 1, which is not the case of the screen of the front face of the smartphone 1.

According to one embodiment, the notification signal is a sound emitted by the speaker 107 of the smartphone 1, for example an intermittent periodic sound. Thus, when the speaker 107 is already provided on the smartphone 1 for other purposes, which is the case in practice, the notification signal can be emitted without adding a specific device to the smartphone 1. Further, an advantage of using such a sound notification signal is that it can been heard by the user, even when the device 2 is disposed on the back face 100 of the smartphone 1.

The two embodiments above may be combined, such that both a light notification signal and a sound notification signal are emitted by the smartphone to the user.

At a next step 510 (block "STOP CHARGING"), it is determined, for example by the smartphone 1, if the NFC charging should continue or not. For example, the smartphone 1 stops providing the NFC field when the smartphone does not detect the device 2 anymore, or when the smartphone receives from the device 2 an instruction to stop the NFC charging.

If the NFC charging must be stopped (branch Y of block 510), the method ends at a step 512 (block "END CHARGING").

If the NFC charging must continue (branch N of the block 510), the method continues at step 502. According to an embodiment, until the end of the NFC charging, the steps 502, 504, 506 are periodically repeated. For example, the step 506 can be implemented for a given period of time before moving to step 510. That is to say, in step 506, according to one embodiment, the notification signal(s) are emitted for a given period of time, for example 5 s, before moving to the next step.

According to one embodiment, the frequency of the notification signal(s) varies with the strength of the NFC field between the smartphone and the device, or, in other words, with the range of values to which the measured value belongs. Thus, based on the frequency of the emitted notification signal(s), the user knows that device 2 approaches, or, on the contrary, moves away from, the ideal position where the device 2 is aligned with the smartphone 1.

According to one embodiment, the frequency of the notification signal(s) increases when the position of the device 2 approaches the ideal position of the device 2 relative to the smartphone 1. Further or alternatively, in one embodiment, when alignment is achieved, the notification signal(s) are continuous for a set amount of time, such as 5 s, and then stop.

According to yet another embodiment, the frequency of the notification signal(s) decreases when the position of the device 2 approaches the ideal position wherein the device 2 is aligned with the smartphone 1. Further or alternatively, in one embodiment, when the measured value belongs to the range of values corresponding to a maximal NFC field strength (alignment is achieved), the notification signal(s) stop, or, in other words, the frequency of the notification signal(s) is null. This prevents the user from being annoyed by continued beeping/flashing lights or sound. Further, as no light or sound is emitted by the smartphone 1 when the device 2 and the smartphone 1 are aligned, the power consumption is reduced compared to a case where a continuous sound and/or light or a high frequency intermittent sound and/or light is emitted when the device 2 and the smartphone 1 are aligned.

Further or alternatively, in one embodiment, when alignment is achieved, another light (such as if different color LEDs are provided) and/or another tone of beep is emitted for a set amount of time, such as 5 s, and then stops.

Although not illustrated in FIG. 5, in one embodiment, when alignment is achieved, the step 506 could be followed by an additional step similar to step 510, with the difference that, if the NFC charging is not finished, this additional step is repeated without being followed by step 502. Thus, in such an embodiment, after alignment is achieved and until the NFC charging ends, no notification signal is emitted.

With the method described above, the user knows if the device 2 is aligned with the smartphone 1, and when they are not aligned, the position of the device 2 relative to the position where the device 2 is aligned with the smartphone 1. Thus, if the device 2 is not aligned with the smartphone 1, the user can move the device 2 relative to the smartphone 1 until he/she receives the notification signal(s) indicating that device 2 and smartphone 1 are aligned.

For example, referring back to the examples of ranges of values indicated previously, the frequencies of the notification signal(s) may be chosen as follow:

the frequency is null for the ranges R1, R1' and R1";

the frequency is equal to 0.5 Hz for the ranges R2, R2', R4', R2" and R4";

the frequency is equal to 1 Hz for the ranges R3, R3', R5' and R3"; and the frequency is equal to 2 Hz for the ranges R4, R6' and R5".

The method described in relation with FIG. 5 allows the device 2 to be aligned with a smartphone 1 which provides NFC charging to the device 2, without requiring another means of wireless communication such as Bluetooth.

Figure 6:
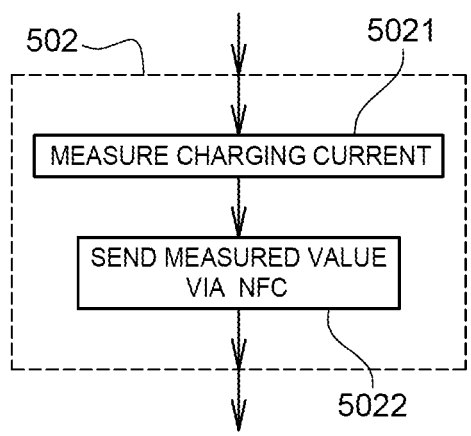
FIG. 6 is a flow chart illustrating an embodiment of a step of the method of FIG. 5.

FIG. 6 is a flow charts illustrating an embodiment of step 502 when the signal representative of strength of the NFC field is the current provided by the device 2 to its battery 208 for charging the battery 208.

In such embodiment, as previously introduced, step 502 comprises a first sub-step 5021 (block "MEASURE CHARGING CURRENT") and a second sub-step S022 (block "SEND MEASURED VALUE VIA NFC").

In sub-step 5021, the device 2 measures the value of the charging current provided to its battery 208.

In sub-step 5022, the device 2 sends the value measured at step S021 to the smartphone 1, by means of NFC communication. Thus, the smartphone 1 gets or obtains the measured value.

According to one embodiment wherein the signal representative of the strength of the NFC field is the charging current provided to the battery 208 of the device 2 further configured to implement sub-steps 5021 and 5022, the device 2 may be configured to store the plurality of ranges of values of this current and to emit one or more notification signals similar to the one or to those emitted by the smartphone 1. In this case, the device 2 comprises a light source on its back face to emit a light notification signal, and/or a speaker to emit a sound notification signal.

In the embodiments described above, the ranges of values are determined during a design phase of the smartphone 1 and/or the device 2. According to a further embodiment, these ranges of values are determined during a configuration phase. This configuration phase is, for example, done before or at the step 500. This configuration phase is for example done each time the method of FIG. 5 is implemented, or only once for a given pair of a smartphone 1 and a device 2. This configuration phase is preferably done when the ranges of values have not been determined during the design phase of the smartphone 1 and/or the device 2.

During this configuration phase, the smartphone 1 and the device 2 are disposed as it was described in relation with FIG. 3. Further, the user moves the device 2 relative to the smartphone 1, for example over approximatively the whole back face 100 of the smartphone, while the smartphone 1 obtains a plurality of measured values of the signal representative of the strength of the NFC field. The smartphone 1, and more particularly its processing unit 112, then determines the maximal value among the plurality of measured values, and the ranges of values as a function of the maximal value.

As an example, the user can be invited by the smartphone 1 to run the configuration phase, for example by means of sounds, for example emitted by the speaker 107, and/or lights, for example emitted by the light source 104, which are different from the notification signal(s) emitted at the step 506 (FIG. 5). During the configuration phase, the smartphone 1 may indicate the user when he/she has to move the device 2 relative to the smartphone, for example in order to ensure that the smartphone 1 has enough time to obtain the measured value for this position of the device 2. This indication for example corresponds to sounds, for example emitted by the speaker 107, and/or lights, for example emitted by the light source 104, which are different from the notification signal(s) emitted at the step 506 (FIG. 5). As an example, the sounds and/or lights emitted for inviting the user to run a configuration phase, and/or for indicating the user to move the device 2 relative to smartphone 1, have frequencies far different from those of the lights and/or sounds emitted during the step 506, for example frequencies at least five or ten time lower or higher than those of the notification signal(s). The sounds emitted for inviting the user to run a configuration phase, and/or for indicating the user to move the device 2 relative to smartphone 1, may further or alternatively have tone different from the tone(s) of the sounds emitted during the step 506. The lights emitted for inviting the user to run a configuration phase, and/or for indicating the user to move the device 2 relative to smartphone 1, may further or alternatively have color different from the color(s) of the lights emitted during the step 506.

Various embodiments and variants have been described. Those skilled in the art will understand that certain features of these embodiments can be combined and other variants will readily occur to those skilled in the art. In particular, the present disclosure applies to NFC-enabled devices 2 other than a smartwatch, which are configured to be charged by the smartphone 1 using NFC charging.

Finally, the practical implementation of the embodiments and variants described herein is within the capabilities of those skilled in the art based on the functional description provided hereinabove.

A method for aligning a smartphone 1 providing NFC wireless power for charging a battery 208 of a device 2, the method may be summarized as including emitting, with a first NFC antenna 102 of the smartphone 1, an NFC field for wirelessly charging the battery 208 of the device 2 including a second NFC antenna 202; obtaining, with the smartphone 1, a measured value of a signal representative of the NFC field strength between the smartphone 1 and the device 2; determining, by the smartphone 1, a range of values of a plurality of ranges of values the measured value belongs; and emitting, by the smartphone 1, at least one notification signal to a user with a frequency determined by the determined range of values.

The smartphone 1 may include a first face having a screen; and a second face 100 opposite to the first face, the first NFC antenna 102 being disposed behind the second face 100, wherein, during the NFC charging, the device 2 is disposed above and facing the second face.

Said at least one notification signal may be a light signal emitted by a light source 104 disposed on the second face 100 and/or a sound signal emitted by a speaker 107 of the smartphone 1.

The frequency may vary with the strength of the NFC field between the smartphone 1 and the device 2.

The frequency may decrease when the strength of the NFC field increases, the frequency being preferably null when the measured value belongs to the range of values corresponding to a maximal NFC field strength.

The signal representative of the strength of the NFC field may be a feeding current provided by the smartphone 1 to the first NFC antenna 102, and wherein obtaining the measured value includes measuring, with the smartphone 1, the feeding current.

The signal representative of the strength of the NFC field may be an AC voltage between extremities 1021, 1022 of the first NFC antenna 102, and wherein obtaining the measured value includes measuring, with the smartphone 1, an envelope of said AC voltage or an envelope of an image of the AC voltage.

The signal representative of the strength of the NFC field may be a charging current provided to the battery 208 of the device 2 by the second NFC antenna 202, and wherein obtaining the measured value includes measuring, with the device 2, the charging current and transmitting, by the device 2 to the smartphone 1, the measured value using NFC communication.

The steps of obtaining the measured value 502, determining the range of values 504 and emitting said at least one notification signal 506 may be periodically repeated, preferably until the NFC charging ends.

The step 504 determining said range of values may include comparing said measured value with thresholds corresponding to boundaries of each the ranges of values of the plurality of ranges of values.

A smartphone 1 configured to implement the method, wherein the smartphone 1 may include a first NFC antenna 102 and is configured to emit, by means of the first NFC antenna 102, an NFC field for wirelessly charging a battery 208 of a device 2 including a second NFC antenna 202; the smartphone 1 may be configured to obtain a measured value of a signal representative of the NFC field strength between the smartphone 1 and the device 2; the smartphone 1 may be configured to determine to which of a plurality of ranges of values said measured value belongs; and the smartphone 1 may be configured to emit at least one notification signal to a user, with a frequency determined by the determined range of values.

The smartphone 1 may include a first face having a screen and a second face 100 opposite the first face, wherein the first NFC antenna 102 is disposed behind the second face, and wherein NFC field emitted by the first NFC antenna 102 is configured to wirelessly charge the battery 208 of device 2 including a second NFC antenna 202.

The smartphone 1 may include a light source 104 disposed on the second face 100, said at least one notification signal being a periodic flashing light signal emitted by said light source 104, the light source 104 being preferably a flash of an image captor 106 of the smartphone 1; and/or the smartphone 1 may include a speaker 107, said at least one notification signal being a sound emitted by said speaker 107, the speaker 107 being preferably configured to emit other sounds than the notification signal.

The signal representative of the strength of the NFC field may be a charging current provided to the battery 208 of the device 2 from the second NFC antenna 202, the smartphone 1 being configured to receive said measured value send by the device 1 using NFC communication.

A device 2 configured to implement the method, wherein the device 2 may include a battery 208 and a second NFC antenna 202 configured to be coupled with a first NFC antenna 102 of a smartphone 1, the device 2 being configured to charge the battery 208 using a NFC field emitted by the first antenna 102 and received by the second antenna 202, to measure a value of a charging current provided to the battery 208 from the second antenna 202 and to send the measured value to the smartphone 1 using NFC communication, the charging current provided to the battery 208 being the signal representative of the strength of the NFC field between the smartphone 1 and the device 2, the device being preferably an internet of things, IoT, device.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   emitting, with a first near field communication (NFC) antenna of a mobile electronic device, an NFC field;
   determining an NFC field strength;
   determining, a range of values of a plurality of ranges of values in which the NFC field strength is within; and
   emitting, by the mobile electronic device, at least one notification signal with a frequency corresponding to the determined range of values.

2. The method of claim 1, wherein the mobile electronic device comprises:
   a first face having a screen; and
   a second face opposite to the first face, the first NFC antenna being between the second face and the screen.

3. The method of claim 2, wherein the emitting of the at least one notification signal includes emitting a sound signal by a speaker of the mobile electronic device.

4. The method of claim 3, wherein the frequency decreases when the strength of the NFC field increases, the frequency being null when a measured value is within the range of values corresponding to a maximal NFC field strength.

5. The method according to claim 1, wherein determining an NFC field strength includes determining the range of values and periodically emitting the at least one notification signal.

6. The method according to claim 1, wherein determining the range of values comprises comparing the NFC field strength with thresholds corresponding to boundaries of each of the ranges of values of the plurality of ranges of values.

7. A method, comprising:
   determining a plurality of ranges of values of a signal of a near field communication (NFC) field of a first electronic device with a second electronic device by:
      determining a maximum value of the signal when the second device is aligned with the first device;
      generating a plurality of lower values of the signal by dividing the maximum value; and
      determining the plurality of ranges of values using the maximum and the lower values of the signal as thresholds for each range of values of the plurality of values; and
   storing the plurality of ranges of values in a memory of the first electronic device.

8. The method of claim 7 wherein the plurality of the ranges of values are contiguous.

9. The method of claim 8, comprising:
   initiating a charging cycle from the first electronic device to the second electronic device;
   determining a measured value of the signal at the first electronic device; and determining a range of the plurality of ranges of values that the measured value is within.

10. The method of claim 9 emitting a signal from the first electronic device in response to the range being outside of an aligned threshold range.

11. A near field communication (NFC) charging device, comprising:
an NFC charging antenna;
a processor coupled to the antenna and configured to:
receive a signal from the antenna; and
determine a range of threshold values of a plurality of ranges into which the signal is between,
a notification device coupled to the processor and configured to output a plurality of notification signals in response to the determined range of threshold values.

12. The device according to claim 11, wherein the notification device includes a speaker configured to output an audio signal.

13. The device according to claim 11 wherein the notification device is a light emitting device configured to periodically illuminate.

14. The device according to claim 11, wherein the plurality of notification signals includes a plurality of colors.

15. The device of claim 11, wherein the processor is configured to, in an initialization phase, determine the plurality of ranges and the threshold values.

16. The device of claim 15, wherein the processor is configured to determine a maximum value of the signal when a chargeable device is aligned with the antenna.

17. The device of claim 16, wherein the processor is configured to:
generate a plurality of lower values of the signal by dividing the maximum value;
determine the plurality of ranges of values using the maximum and the lower values of the signal as thresholds for each range of values of the plurality of values; and
storing the plurality of ranges of values in a memory of a first electronic device.

* * * * *